United States Patent
Chrobaczek et al.

(10) Patent No.: US 6,706,812 B2
(45) Date of Patent: Mar. 16, 2004

(54) POLYORGANOSILOXANE MIXTURES FOR TREATING FIBRE MATERIALS

(75) Inventors: Harald Chrobaczek, Augsburg (DE); Ingo Görlitz, Augsburg (DE); Erich Rössler, Stadtbergen (DE); Mark Oelschläger, Aalen (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/257,787

(22) PCT Filed: Apr. 10, 2001

(86) PCT No.: PCT/EP01/04060

§ 371 (c)(1),
(2), (4) Date: Oct. 17, 2002

(87) PCT Pub. No.: WO01/81454

PCT Pub. Date: Nov. 1, 2001

(65) Prior Publication Data

US 2003/0109663 A1 Jun. 12, 2003

(51) Int. Cl.$^7$ ................ C08L 83/00
(52) U.S. Cl. ........ 524/838; 524/837; 525/477; 525/478; 252/8.61; 252/8.62; 252/8.63; 528/31; 528/38
(58) Field of Search .............. 252/8.61, 8.62, 252/8.63; 524/837, 838; 525/477, 478; 528/31, 38

(56) References Cited

U.S. PATENT DOCUMENTS

| 3,941,856 A | * | 3/1976 | Creasey et al. | 525/478 |
| 4,177,176 A | | 12/1979 | Burrill et al. | 260/29.2 |
| 5,118,535 A | * | 6/1992 | Cray et al. | 427/387 |
| 5,540,952 A | * | 7/1996 | Canivenc et al. | 427/387 |
| 5,562,761 A | | 10/1996 | Dirschl et al. | 252/8.62 |

FOREIGN PATENT DOCUMENTS

| DE | 4330967 | 3/1995 |
| DE | 10012913 | 9/2001 |
| EP | 0702106 | 3/1996 |
| EP | 0767217 | 4/1997 |
| EP | 0841366 | 5/1998 |

* cited by examiner

Primary Examiner—Robert Dawson
Assistant Examiner—Marc S. Zimmer
(74) Attorney, Agent, or Firm—Kevin T. Mansfield

(57) ABSTRACT

Polyorganosiloxane mixtures are obtainable by reacting linear polysiloxanes containing Si—H-bonds with linear dihydroxypolysiloxanes and amino-functional silanes. The reaction is carried out in such a way that the resultant product mixture still contains Si—H— bonds and leads to crosslinked structures. The polysiloxane mixtures obtained are useful for hydrophobicizing fiber materials, especially nonwovens.

18 Claims, No Drawings

POLYORGANOSILOXANE MIXTURES FOR TREATING FIBRE MATERIALS

This invention relates to specific polysiloxane mixtures, to a process for preparing these mixtures and also to the use of such mixtures for treating fiber materials, especially nonwovens.

It is known to use polyorganosiloxanes containing Si—H groups for finishing, including hydrophobicizing, fiber materials. The treatment of nonwovens with polysiloxanes is also known. It is further known that polyorganosiloxanes containing Si—H groups can react with water, in which case the Si—H groups are converted into Si—OH groups by detachment of hydrogen. Si—H groups also react with other compounds containing OH groups, including for example with polyorganosiloxanes having Si—OH groups, in which case the detachment of hydrogen gives rise to new Si—O— bonds, especially Si—O—Si. When fiber materials are treated with a mixture of products containing siloxanes with Si—H groups and siloxanes with Si—OH groups in the absence of a catalyst, unsatisfactory water-repellent properties are obtained. But even the use of a customary crosslinking catalyst does not ensure that all such mixtures will provide good results.

Polyorganosiloxanes based on polyorganohydrosiloxanes, $\alpha,\omega$-dihydroxypolydiorganosiloxanes, optionally amino-functional silicon compounds and also catalysts are also known and described for example in EP-A 767 217. According to this EP-A, the polymers are prepared using three different dihydroxypolysiloxanes having different molecular weights. The use of amino-functional monoalkoxy- or dialkoxy-silanes is not described. The reaction is carried out in the presence of a condensation catalyst. Polyorganosiloxanes based on polyorganohydrosiloxanes, $\alpha,\omega$-dihydroxypolydiorganosiloxanes and amino-functional alkoxysilanes and their use for finishing fiber materials are likewise known and described for example in EP-A 702 106. Here too the reaction is carried out in the presence of a crosslinking catalyst. A chemical reaction between the components mentioned is not carried out prior to application to the fiber material. Further components take part in the reaction on the fiber material.

Also known are foamable polyorganosiloxane compositions. They are obtainable by mixing organosiloxane rubbers, polyorganohydrosiloxanes, $\alpha,\omega$-dihydroxypolydiorganosiloxanes and amino-functional alkoxysilanes and optionally further starting materials; this is described in EP-A 841 366 for example. The starting materials used are block copolymers containing R $SiO_{1.5}$ units, i.e. Si atoms to which 3 oxygen atoms are attached.

U.S. Pat. No. 4,177,176 describes compositions for the treatment of fiber materials. The compositions contain a modified $\alpha,\omega$-dihydroxypolydimethylsiloxane which contains amino groups and is preparable from unsubstituted $\alpha,\omega$-dihydroxypolydimethylsiloxane by reaction with an amino-containing alkyldialkoxysilane. The compositions further contain a siloxane having Si—H bonds. The amino-functional siloxane and the siloxane containing Si—H bonds are present as a mixture; compositions including a product formed by a chemical reaction between the two siloxanes mentioned are not mentioned in this US reference.

The prior art polysiloxane compositions have disadvantages. Without a partial chemical reaction between a polysiloxane containing Si—H bonds, an $\alpha,\omega$-dihydroxypolydiorganoiloxane and an amino-functional dialkoxysilane prior to application to fiber materials, the magnitude and/or durability of the effects obtainable on the fiber materials are not optimal. This applies in particular when nonwovens are treated with polysiloxane compositions. The use of prior art compositions here frequently leads to nonoptimal nonwoven properties as regards obtainable effects and processibility of nonwovens.

Disadvantages also result on using polysiloxane compositions prepared using high molecular weight polysiloxanes or polysiloxanes which contain relatively large amounts of R $SiO_{1.5}$ units and which are high molecular weight, i.e. which contain Si atoms to which three oxygen atoms are attached.

It is an object of the present invention to provide improved polyorganosiloxane mixtures for treating fiber materials, preferably textile fabrics, especially nonwovens. The improved polyorganosiloxane mixtures shall be stable in storage, both neat and in the form of aqueous dispersions having a suitable pH, and impart hydrophobic properties to fiber materials treated therewith, and the adhesion of the polysiloxane mixtures to the fiber material shall be good even after laundering operations.

This object is achieved by a polyorganosiloxane mixture obtainable by reacting a linear polyorganosiloxane A) containing 5 to 70, preferably 10 to 60, silicon atoms, units of the general formula (I)

and optionally units of the general formula (II)

and having end groups formed by $(R^1)_3Si$—O— radicals or by $H(R^1)_2Si$—O— radicals, with a linear $\alpha,\omega$-dihydroxypolydiorganosiloxane B) containing 10 to 150, preferably 20 to 80, silicon atoms, units of the abovementioned general formula (II) and optionally in addition units of the formula (IV)

and having end groups formed by HO $Si(R^1)_2$—O— radicals and with a silane C) of the general formula (III)

and optionally with a linear polyorganosiloxane D) containing either units of the formula (I) or of the modified formula (I) where the hydrogen atom is replaced by OH and additionally units of the formula (IX)

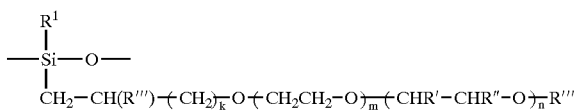
(IX)

and optionally units of the formula (II), the end groups of the polyorganosiloxane D) being formed by $(R^1)_3Si$—O— radicals or by $HO(R^1)_2Si$—O— radicals, wherein every $R^1$ is independently an alkyl radical of 1–6 carbon atoms or a phenyl radical, preferably a methyl radical, every $R^2$ is independently an alkyl radical of 1–6 carbon atoms, preferably a methyl or ethyl radical, Y is a radical of the formula V, VI, VII or VIII

(V)

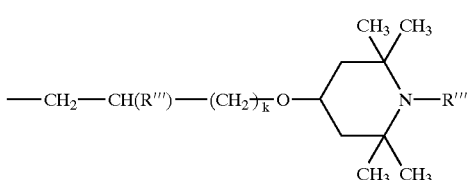
(VI)

(VII)

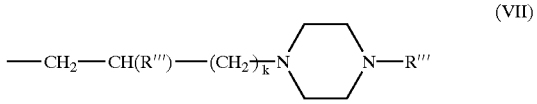

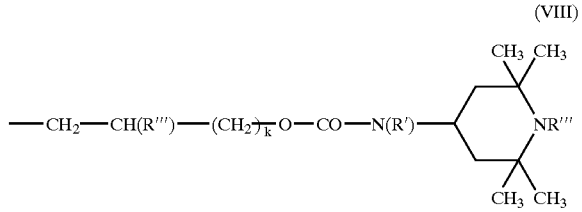
(VIII)

where

R''' is H or $CH_3$, one of R' and R'' is hydrogen and the other is $CH_3$, m is from 5 to 40, k is from 0 to 6, preferably 1, t is from 2 to 8, preferably from 2 to 4, n is from 0 to 10, l is from 0 to 3, preferably 0 or 1, $R^5$ is H, —CO—$CH_3$, —CO—$(CH_2)_x$OH, —$CH_2$—$(CH_2)_x$ $CH_3$ or cyclohexyl and x is from 1 to 3, preferably 1 or 2, the reaction being carried out without polyorganosiloxane containing units of the general formula $R^4SiO_{1.5}$ where $R^4$ is a monovalent organic radical, as starting material and the reaction being carried out in such a way that the number of the Si—H units present in the polysiloxane mixture obtained is 60 to 95% of the number of Si—H units which were present in the form of the components A) and D) prior to the reaction and the reaction being carried out without use of a metal-containing crosslinking or condensation catalyst.

The polyorganosiloxane mixtures of the invention are preparable by reacting the three starting materials A, B and C mentioned above and in claim 1 and optionally the starting material D. This reaction can be effected by initially mixing all three or four starting materials in the presence or absence of an organic solvent. When a solvent is used, it has to be inert, i.e. it must not enter chemical reactions with the starting materials, with the intermediates and with the polysiloxanes formed as end products. Preferably, no organic solvent is used.

The three or four starting materials mentioned need not all be present from the start, only two or three thereof. It will be advantageous in many cases if, in the reaction, the addition of one of the components A) and C) to the reaction mixture only takes place after the addition of component B). The procedure in this case is to start the reaction with a mixture of A) and B) and optionally D) or of B) and C) and optionally D) and to add component C) or A) respectively later. The reaction may similarly be carried out by using at the start only a portion of the contemplated amount for one or more of the three starting components and to add the rest later.

However, the following requirement applies to all the variants mentioned: all three components A), B) and C) must take part in the chemical reaction. In other words, when all of the original amount of one of the three components is present in chemically unchanged form after the reaction has ended, the product of the reaction will not constitute a mixture according to the invention. It is possible, however, for the reaction mixture still to contain fractions of unconverted starting compounds after the reaction, and this is even necessary in the case of starting component A). This can be controlled via the amounts of starting materials used, for example by using an excess of one of the components. Polyorganosiloxane mixtures according to the invention will be present when, after the reaction has ended, substantial fractions of each of the starting components B) and C) originally used have been chemically converted. By substantial fraction is meant that at least 50% of the originally used amount of component B) and at least 95% of the originally used amount of component C) have been chemically converted. With regard to the total number of Si—H bonds in A) and D), from 5 to 40% will have to have reacted. When a component D) containing Si—H bonds is used, more than 40% of component A) may be reacted. The values mentioned also apply to the preferred case where water is additionally used in the reaction. The use of water is frequently of advantage and leads to products which are believed to form in part after a preceding reaction of Si—H groups with water and/or after a hydrolysis of Si—$OR^2$ bonds by added water. When water is additionally used in the reaction, the reaction is preferably carried on until 95% to 100% of the water used has reacted. Water may be included in the reaction mixture in such a way that water is present right at the start of the reaction, but water may also be added later.

It is believed that the reaction taking place between the starting components A), B) and C) and also optionally D) involves condensations where the terminal OH groups of component B) react with the $OR^2$ groups of component C) (or, if appropriate, hydrolyzates thereof) and with Si—H bonds of component A) and, if present, component D) or with Si—OH groups formed by reaction of component A) or D) with water.

The use of component A), i.e. reaction of Si—H bonds or of Si—OH bonds formed therefrom in the presence of water, with component B) provides crosslinked structures which may, if desired, be further crosslinked, especially since polysiloxane mixtures according to the invention include products having Si—H bonds. The reason why such products having Si—H bonds are present in the reaction mixture is, for example, that an excess of component A) was used from the start.

The mixtures according to the invention possess good stability in storage not only neat but also in the form of aqueous dispersions in the pH range of 2–4. They are very useful for treating fiber materials, preferably textile fabrics such as wovens or knits and especially nonwovens. To treat fiber materials, they are preferably applied to the fiber materials in the form of aqueous dispersions, for example by padding. They confer on the thus finished fiber materials a soft hand and also a high level of water-repellent properties possessing good durability to laundering. When, in contrast, there is a desire for a less high level of water-repellent properties, or even for a certain degree of hydrophilicity, this is likewise obtainable with mixtures of the invention by additionally using component D) in their preparation.

After they have been applied to substrates, for example in the form of an aqueous dispersion, by padding, mixtures according to the invention are capable of forming films on the substrate. The substrate may be a textile fiber material. The rate of film formation may be influenced by the addition of polyurethanes, especially polyurethanes still containing isocyanate groups which are reversibly blocked by a blocking agent such as an alkali metal bisulfite or a ketone oxime. This makes it possible for example to adapt the properties of textile fabrics composed of synthetics such as polyester or polyamide to the desired end use in a specific manner.

The polyorganosiloxane A), one of the starting compounds, has a linear construction, i.e. it contains a linear chain of

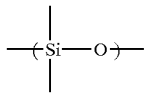

units. Each Si atom in this chain has two oxygen atoms and at least one $R^1$ radical attached to it. The fourth radical attached to each Si atom may be a hydrogen atom or another $R^1$ radical. However, at least some of the Si atoms must have an H atom attached to them, i.e. component A) must contain units of the formula (I).

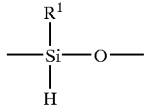

(I)

It may additionally contain units of the formula (II).

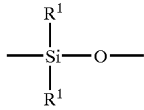

(II)

Preferably, 20 to 100%, especially 20 to 80%, of the silicon atoms of component A) each have a hydrogen atom attached to them. When component A) contains units of the formula (II) as well as of the formula (I), these individual units may be distributed across the polysiloxane chain in any desired pattern.

The siloxane used as component A) contains 5 to 70, preferably 10 to 60, silicon atoms. The ends of the linear polyorganosiloxane chain of component A) are formed by radicals of the formula $H(R^1)_2Si$—O— or by radicals of the formula $(R^1)_3Si$—O—. $(R^1)_3Si$—O— is preferable as chain end. Every $R^1$, not only in the case of component A) but also in the hereinbelow indicated formulae for components B), C) and D), is independently an alkyl radical of 1 to 6 carbon atoms or a phenyl radical. The alkyl radicals may be linear or branched. Preferably, in all the formulae 80 to 100% of all the $R^1$ radicals present are each $CH_3$. Products useful as component A) ("hydrosiloxanes") are commercially available, for example from Wacker Chemie, Germany, or are preparable by known methods.

Component A) may also be a polyorganosiloxane which, as well as units of the formula (I), also contains units of the hereinbelow mentioned formula (IX), i.e. side chains containing ethoxylated or ethoxylated/propoxylated groups. Such polysiloxanes are described in German Patent Application 100 12 913.7 (filed Mar. 16, 2000).

These here cited polysiloxanes may serve not just as component A) in the preparation of mixtures according to the invention. They may also be added subsequently to mixtures or compositions according to the invention, in the form of aqueous dispersions, which are described hereinbelow. They are preparable, for example, by ethoxylating and, optionally, additionally propoxylating allyl alcohol and reacting the resultant alkoxylated allyl alcohol with a polysiloxane having Si—H bonds. For the resultant product to be useful as component A) for preparing polysiloxane mixtures according to the invention, it must contain units of the formula (I). Consequently, the aforementioned reaction of the alkoxylated allyl alcohol with the polysiloxane containing Si—H bonds has to be carried out under such conditions that the resultant product still contains units of the formula (I) (Si—H bonds). This is controllable via the amount ratios used.

The second starting material needed to prepare polyorganosiloxane mixtures according to the invention (component B) is likewise a linear polysiloxane, namely an α,ω-dihydroxypolydiorganosiloxane. Unlike component A), it does not contain any Si—H bonds, but has two oxygen atoms and two carbon atoms attached to every silicon atom. Component B) contains 10 to 150, preferably 20 to 80, silicon atoms. The two chain ends of B) are formed by radicals of the formula HO—Si$(R^1)_2$—O—. The polysiloxane chain of component B) must contain diorganosiloxy units of the formula (II).

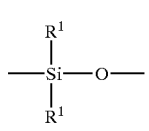

(II)

It may additionally contain units of the formula (IV).

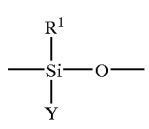

(IV)

Here $R^1$ is as defined above and Y is a radical of the formula (V), (VI), (VII), (VIII).

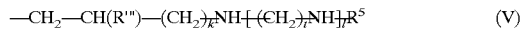

(V)

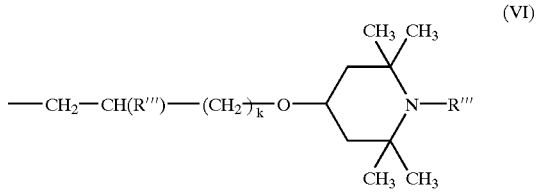

(VI)

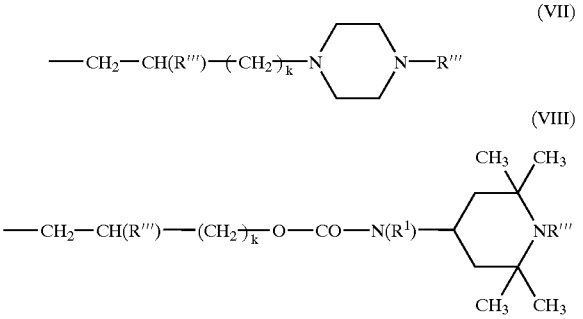

(VII)

(VIII)

In these formulae, R''' is hydrogen or a methyl group, k is from 0 to 6, preferably 1, t is from 2 to 8, preferably from 2 to 4, and l is from 0 to 3, preferably 0 or 1. $R^5$ is H or —$COCH_3$, —CO—$(CH_2)_t$OH, —$CH_2$—$(CH_2)_t$CH_3 or cyclohexyl. Particularly preferably Y is a radical of the formula (V), especially a radical of the formula (V) which contains a primary amino group ($R^5$=H) and optionally additionally a secondary amino group (l=0 or 1).

It is preferable for 60 to 100% of the units present in the polysiloxane chain of component B) to conform to the formula (II) and 0 to 40% to the formula (IV). By introducing amino groups (formula IV), mixtures according to the invention may be used to confer a particularly soft hand on fiber materials.

Linear α,ω-dihydroxypolydiorganosiloxanes useful as component B) are commercially available, for example from Wacker Chemie, Germany, or are preparable by known methods.

The third starting material required to prepare polyorganosiloxane mixtures according to the invention, component C), is a silane of the general formula (III)

(III)

where $R^1$ and Y are each as defined above, every $R^2$ is independently an alkyl radical of 1 to 6 carbon atoms, preferably a methyl or ethyl radical, and x is from 1 to 3, preferably 1 or 2. In the formula (III), preferably $R^1$ is methyl, Y is a radical of the formula (V) and $R^5$ is H.

Compounds useful as component C) are commercially available, for example products of the "Dynasylan" range from Brenntag, Germany, or products from Wacker Chemie, Germany.

The polyorganosiloxane mixtures according to the invention include products having crosslinked structures. However, they are not prepared using polysiloxane starting materials already containing crosslinked units, i.e. units in which 3 oxygen atoms are attached to same silicon atom. On the contrary, the polysiloxanes used as component A) and polysiloxanes used as component B) have a purely linear construction and do not contain any units of the general formula $R^4$—$SiO_{1.5}$. The same is true of polysiloxane D). In this formula $R^4$—$SiO_{1.5}$, $R^4$ is a monovalent organic radical. In contrast, component C), which is a monomeric silane, may contain a silicon atom to which 3 oxygen atoms are attached, namely when x is 3 in the formula (III). Preferably, however, x is 1 or 2, especially 2.

A particular advantage of polyorganosiloxane mixtures according to the invention is that they are prepared without use of a customary metal-containing crosslinking or condensation catalyst. Similarly, the treatment of fiber materials with aqueous dispersions of polysiloxane mixtures according to the invention frequently does not require a customary crosslinking or condensation catalyst, especially no metal-containing catalyst, to bring about further crosslinking and bonding to the fiber material. After application to fiber materials, mixtures according to the invention are further crosslinkable, since they still contain Si—H bonds.

Because they are stable in storage not only in the neat state but also in the form of acidic aqueous dispersions, polysiloxane mixtures according to the invention have the advantage that they can be made available to textile finishers as one-component systems. The finisher need only adjust the concentration and pH of the aqueous dispersions to the values needed for finishing.

Polysiloxane mixtures according to the invention have the further advantage that they can be used to prepare compositions in the form of aqueous dispersions by the exclusive use of nonionic dispersants. Prior art silicone dispersions, in contrast, are frequently cationic formulations, owing to the presence of metal salts as catalysts. Cationic formulations, however, sometimes have poor compatibilities with certain desired liquor ingredients such as pigments.

Polysiloxane mixtures according to the invention may be prepared using mixtures of each of the products that come within the definition of component A) or B) or C) or D). More particularly, the starting components A), B) and D) are normally mixtures as customarily produced in the synthesis of the polymeric components A), B) and D).

Polyorganosiloxane mixtures according to the invention in the neat state or in the form of aqueous dispersions may include additional constituents. These may be products which are added to the mixtures after the described reaction of A) with B) and C) and are desirable as additives in the treatment of fiber materials. But they may also be products which are added before or during this reaction. However, the constituents additionally included before or during the reaction should be inert, i.e. not enter chemical reactions with the starting components A), B) and C). An exception is the use of a polysiloxane D), which may take part in the reaction, as more particularly described hereinbelow.

Preferred mixtures according to the invention have a viscosity at 20° C. of less than 1 000 mPa sec, especially a viscosity of not more than 500 mPas, for example 100 to 500 mPa sec. Preferred embodiments of mixtures according to the invention further include at 20° C. liquid constituents only and are completely soluble in methylene chloride, petroleum ether (40–80° C. fraction) and toluene, of course with the exception of any water present.

It is important that polyorganosiloxane mixtures according to the invention are prepared using as component A) only polyorganosiloxanes containing 5 to 70, preferably 10 to 60, silicon atoms and as component B) only polysiloxanes having 10 to 150, preferably 20 to 80, silicon atoms. Similarly, the optional additional component D) preferably has a relatively short chain, namely 10 to 70 silicon atoms.

The use of relatively short-chain and uncrosslinked polysiloxanes A), B) and D) as starting materials ensures that the polysiloxane mixtures according to the invention likewise do not have very high molecular weights, even though they are crosslinked to a certain extent, and are therefore particularly useful for treating nonwovens.

Compositions according to the invention may be prepared using a polyorganosiloxane D) as well as the starting materials A), B) and C) and optionally water. This component D) is a linear polysiloxane whose end groups are formed by $(R^1)_3Si$—O— radicals or by $HO(R^1)_2Si$—O— radicals. It is linear, i.e. it contains silicon atoms only within a linear chain. This chain contains units of the formula (IX).

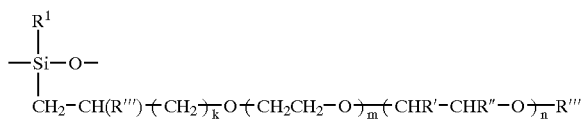

(IX)

In it, R¹, R''' and k are each as defined above, m is from 5 to 40 and n from 0 to 10. Preferably m>n. In each —CHR'—CHR"—O— unit, one of R' and R" is hydrogen and the other is methyl. Polysiloxanes D) are preparable by reacting polysiloxanes containing Si—H bonds with ethoxylated or ethoxylated/propoxylated allyl alcohols using an excess of Si—H bonds over C=C double bonds.

Polysiloxanes D) contain further units in the chain as well as units of the formula (IX). These further units are either units of the abovementioned formula (I) or units which conform to a modified formula (I), the modification being such that, in the formula (I), it is not an H atom but an OH group which is attached to the silicon atom. Units of the thus modified formula (I) are formed by reaction of units of the formula (I) with water at pH>7. In addition, the polysiloxane D) may optionally contain units of the formula (II). In polysiloxanes that are very useful as starting component D), 10 to 40% of the total number of silicon atoms are present in the form of units of the formula (IX), 10 to 40% in the form of units of the formula (I) or of the modified formula (I) and the rest in the form of units of the formula (II).

By using a polyorganosiloxane D) in the preparation of polyorganosiloxane mixtures according to the invention, it is possible to adjust the hydrophilic/hydrophobic properties of fiber materials treated therewith to the intended end use in a specific manner.

Normally, the polyorganosiloxanes A), α,ω-dihydroxypolydiorganosiloxanes B) and silanes C) and optionally polysiloxanes D) and water are added in the reaction in any order. But it is advantageous to add one of the components A) and C) to the reaction mixture after the addition of component B). More particularly, the addition of component B) later than components A) and C) should be avoided. This prevents an unwanted reaction exclusively between A) and C). It is possible to add the total amount of each of the individual components not only all at once but also a little at a time.

Polyorganosiloxane mixtures according to the invention that are highly suitable for treating fiber materials are obtained on reacting 20 to 60 parts by weight of A), 40 to 75 parts by weight of B) and 0.01 to 5 parts by weight of C). When water is used as well, polyorganosiloxane mixtures according to the invention that are particularly highly suitable are obtained on adding 0.01 to 7 parts by weight, preferably 0.1 to 5 parts by weight, of water in the reaction of the above-recited parts by weight of A), B) and C).

When polysiloxane mixtures according to the invention are prepared additionally using a polyorganosiloxane D), this component D) is preferably added in an amount of 10 to 30 parts by weight, based on the above-specified parts by weight for the components A), B) and C).

The reaction leading to polyorganosiloxane mixtures according to the invention is carried out without use of a metal-containing crosslinking or condensation catalyst. This is a cost and ecological advantage over existing processes, where crosslinked polysiloxane structures are prepared using metal-containing catalysts. Normally, the further crosslinking of products according to the invention after they have been applied to fiber materials is also possible without addition of metal-containing catalysts.

The reaction to prepare polysiloxane mixtures according to the invention has to be carried out in such a way that the number of units having Si—H bonds that are present in the mixture obtained is 60 to 95% of the number of Si—H units present in the form of components A) and D) before the reaction.

The polyorganosiloxane mixtures according to the invention are further crosslinkable, since they still contain units of the general formula (I). Preference is given to polyorganosiloxane mixtures according to the invention where the reaction has been carried on to such an extent that, after the reaction, 70–90% of the Si—H units originally used in the form of component A) are still present.

Polyorganosiloxane mixtures according to the invention that are highly useful for treating fiber materials are obtained by reacting at a temperature of 10 to 130° C., preferably 10 to 90° C., particularly preferably 20 to 40° C. The reaction time is preferably in the range from 30 minutes to one day, especially in the range from 30 minutes to 8 hours, and the temperature and time should be controlled according to the degree of conversion or crosslinking desired.

It is advantageous for the polyorganosiloxane mixtures according to the invention to be prepared and used as aqueous dispersions. For this purpose, the polyorganosiloxane mixtures according to the invention are preferably converted into aqueous dispersions by means of known processes using dispersants. Useful dispersants include those known to one skilled in the art for dispersing polyorganosiloxanes, for example anionic, nonionic, cationic and amphoteric emulsifiers and also mixtures thereof. Of particular utility are nonionic dispersants, for example ethoxylated alcohols having 8 to 14 carbon atoms in the alkyl chain. The desired pH may be set before or during the dispersing of the resultant polyorganosiloxane mixtures in water. The pH of the compositions obtained on dispersing polysiloxane mixtures according to the invention in water is preferably adjusted to a value between 2 and 4. The pH may be set using dilute sulfuric acid, for example. Aqueous dispersions of polysiloxane mixtures according to the invention are stable at pH 2 to 4 in that the Si—H bonds still present will react further at room temperature only extremely slowly, if at all.

After the reaction between components A), B) and C) and optionally D) has ended, i.e. as soon as component C) has reacted substantially completely, polyorganosiloxane mixtures according to the invention are storable in the absence of water. Similarly, compositions obtained after dispersion in water are storable, provided the pH has been set to a value of not more than 4. Normally, the higher the residual level of Si—H bonds, the lower the pH required.

The reaction between the components A), B) and C) is preferably carried out under an inert gas, for example under $N_2$. The fraction of inert gas in the ambient atmosphere may be varied to control the extent of the formation of crosslinked units.

The polyorganosiloxane mixtures according to the invention are useful for treating fiber materials, preferably textile fabrics, especially nonwovens. Highly useful fiber materials are composed of polyester, polyamide, but also of other fibers and mixtures thereof.

The polyorganosiloxane mixtures according to the invention already exhibit a certain degree of crosslinking, which provides advantages with regard to stability in storage and with regard to durability for the mixtures as such and for the compositions that include mixtures according to the invention in the form of aqueous dispersions. Further crosslinking on the fiber materials through participation of the Si—H bonds still present may be effected at elevated temperature.

Mixtures according to the invention are useful for treating fiber materials, especially nonwovens, in the form of aqueous dispersions in particular. These dispersions may have further desired constituents added to them. Application can be according to known processes, for example by padding, in which case the aqueous dispersions are first adjusted to the desired use concentration.

Polysiloxane mixtures according to the invention confer advantageous properties on fiber materials, for example nonwovens. These advantageous properties include soft hand and graduated and controllable hydrophobic properties.

After dispersions of polysiloxane mixtures according to the invention have been applied, the fiber materials are dried by customary processes. This may be followed by further crosslinking of any Si—H bonds still present by curing at elevated temperature, for example in the range from 120 to 180° C.

The reaction leading to polysiloxane mixtures according to the invention has scope for some interesting modifications whereby product mixtures having particular properties are obtainable. These possibilities are presented hereinbelow under points a) to d). However, they and the products obtained thereby do not come within the claims presented here. No protection is claimed for them.

a) It is possible to replace a certain amount, for example 10 to 40% of the amount, of the linear dihydroxydiorganopolysiloxane B) by a nonlinear, i.e. crosslinked, polyorganosiloxane having $HO(R^1)_2Si$—O— end groups.

b) When the treatment is only intended to confer a soft hand on the treated fiber materials and no advantage is taken of the possibility of carrying out further crosslinking of the polysiloxane mixtures on the fiber materials, appreciably lower amounts of polyorganosiloxane A) may be used; these amounts can be so low that the resultant product mixtures contain substantially no Si—H bonds. In this case, owing to the absence of Si—H units, the pH of aqueous dispersions of the polysiloxane mixtures may also be in the alkaline range.

c) In addition to silane C) there may be used one or more further silanes, for example silanes in which radicals attached to silicon contain perfluorinated alkyl groups. This makes it possible, if desired, to obtain polysiloxane mixtures capable of conferring oil-repellent properties on fiber materials. Similarly, as well as polysiloxanes D) there may be used polysiloxanes which are formed by addition of the Si—H group of polyalkylhydrosiloxanes onto unsaturated compounds which, as well as C=C double bonds, contain perfluorinated radicals with or without phosphorus atoms. By the presence of phosphorus atoms it is possible, if desired, to obtain flame-retardant effects in the case of finished textile fabrics.

d) Polyorganosiloxane A) may also be a product which, as well as units of the formula (I) and optionally of the formula (II), additionally contains units which are formed by reaction of an Si—H bond with a reactive group of a commercially available UV absorber. This provides polyorganosiloxane mixtures having UV-absorbing properties after reaction with the components B) and C).

The invention will now be illustrated by examples.

INVENTIVE EXAMPLE

In a reaction vessel, 230 g of a commercially available α,ω-dihydroxypolydimethylsiloxane (component B) were reacted with 280 g of a commercially available polysiloxane having Si—H bonds (component A) and with 2.6 g of an amino-functional diethoxymethylsilane (component C) of the formula Y—$Si(CH_3)(OC_2H_5)_2$. The reaction took about 5 hours at 30° C. To this end, components A) and B) were initially charged and heated to 30° C. and then component C) was gradually added. The mixture obtained contained precrosslinked polysiloxanes.

Component A) had about 60 silicon atoms, component B) about 40 silicon atoms, and the Y radical in component C) conformed to the formula (V) of claim 1 with k=1, l=0, R'''=H and $R^5$=H. The product mixture obtained contained about 91% of Si—H bonds, based on the number of Si—H bonds originally used (determined by titration of HBr by the thiosulfate method, the HBr being formed by reaction of the Si—H bonds with N-bromosuccinimide). The polysiloxane mixture obtained was combined at room temperature with an aqueous solution containing 410 g of water, about 30 g of a low molecular weight diol, about 30 g of an ethoxylated fatty alcohol and 2 g of concentrated hydrochloric acid. This aqueous solution was added to the above-described polysiloxane mixture with stirring. High pressure homogenization provided an aqueous, slightly yellow, thinly liquid dispersion which, if necessary after dilution, is particularly useful for treating fiber webs. The dispersion contained about 41% of water and 52% of siloxane mixture.

Comparative Example 1

Two separately prepared aqueous dispersions were combined to prepare an aqueous dispersion containing 56.5% of water, 27.7% of an amino-functional α,ω-dihydroxypolydimethylsiloxane, 10.8% of a polyalkylhydrosiloxane and 5% of a mixture of low molecular weight diol, ethoxylated fatty alcohol and hydrochloric acid. These 5% were made up of the same components as used in the inventive example to prepare the aqueous solution.

Comparative Example 2

An aqueous dispersion was prepared to contain the same components as the dispersion of Comparative Example 1, but in changed amount ratios, namely 49.8% of water, 15.9% of an amino-functional polydimethylsiloxane, 28.3% of polyalkylhydrosiloxane and 6% of the remaining constituents.

The amounts were chosen so that the dispersion of Comparative Example 1 had the same nitrogen content as the dispersion of the Inventive Example. Comparative Example 2 contained the same amount of hydrosiloxane as used in the Inventive Example prior to the reaction of components A), B) and C). The dispersions of Comparative Examples 1 and 2 thus contained an amino-functional polysiloxane and a polyalkylhydrosiloxane side by side without any chemical reaction (precrosslinking) having taken place beforehand between these two ingredients.

The dispersions of the Inventive Example and of Comparative Examples 1 and 2 were then compared with each other.

The dispersion of the Inventive Example conferred a pleasantly soft hand on a fiber material treated therewith, coupled with excellent durability to laundering operations. This dispersion was convertible into films following predrying in the course of storage. It is particularly suitable for treating nonwovens and may be subjected to a further crosslinking reaction on them, if desired. This is a way to further enhance the durability of the effects.

The two dispersions of Comparative Examples 1 and 2 also conferred a pleasantly soft hand on fiber materials treated therewith. However, the durability of the effects is less than in the case of the Inventive Example. Secondly, they were inferior to the dispersion of the Inventive Example with regard to the effects obtainable in the treatment of fiber webs.

What is claimed is:

1. A polyorganosiloxane mixture obtainable by reacting a linear polyorganosiloxane A) containing 5 to 70 silicon atoms, units of the general formula (I)

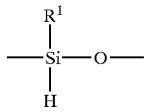
(I)

and optionally units of the general formula (II)

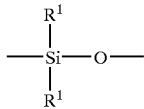
(II)

and having end groups formed by $(R^1)_3Si$—O— radicals or by $H(R^1)_2Si$—O— radicals, with a linear α,ω-dihydroxypolydiorganosiloxane B) containing 10 to 150 silicon atoms, units of the abovementioned general formula (II) and optionally in addition units of the formula (IV)

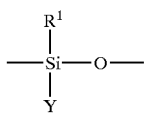
(IV)

and having end groups formed by $HO\ Si(R^1)_2$—O— radicals
and with a silane C) of the general formula (III)

(III)

and optionally with a linear polyorganosiloxane D) containing either units of the formula (I) or of the modified formula (I) where the hydrogen atom is replaced by OH and additionally units of the formula (IX)

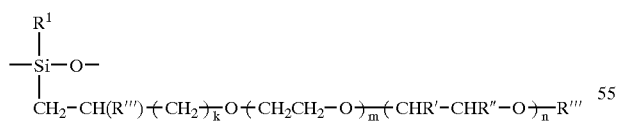
(IX)

and optionally units of the formula (II), the end groups of the polyorganosiloxane D) being formed by $(R^1)_3Si$—O— radicals or by $HO(R^1)_2Si$—O— radicals,
wherein every $R^1$ is independently an alkyl radical of 1–6 carbon atoms or a phenyl radical, every $R^2$ is independently an alkyl radical of 1–6 carbon atoms, Y is a radical of the formula V, VI, VII or VIII

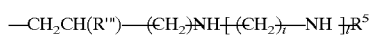
(V)

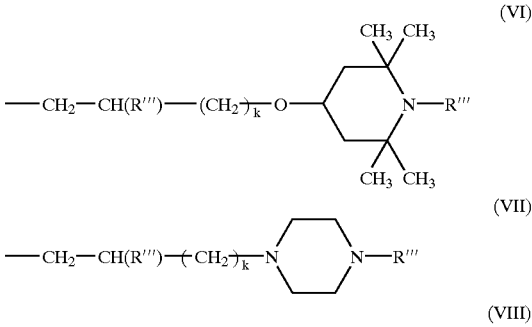

where

R''' is H or $CH_3$, one of R' and R'' is hydrogen and the other is $CH_3$, m is from 5 to 40, k is from 0 to 6, t is from 2 to 8, n is from 0 to 10, l is from 0 to 3, $R^5$ is H, —CO—$CH_3$, —CO—$(CH_2)_t$OH, —$CH_2$—$(CH_2)_t CH_3$ or cyclohexyl and x is from 1 to 3, the reaction being carried out without polyorganosiloxane containing units of the general formula $R^4SiO_{1.5}$ where $R^4$ is a monovalent organic radical, as starting material and the reaction being carried out in such a way that the number of the Si—H units present in the polysiloxane mixture obtained is 60 to 95% of the number of Si—H units which were present in the form of the components A) and D) prior to the reaction and the reaction being carried out without use of a metal-containing crosslinking or condensation catalyst.

2. A polyorganosiloxane mixture according to claim 1, wherein water is additionally used in the reaction.

3. A polyorganosiloxane mixture according to claim 1, wherein, in the reaction, the addition of one of the components A) and C) to the reaction mixture only takes place after the addition of component B).

4. A polyorganosiloxane mixture according to claim 1, wherein the reaction is carried out with 20 to 60 parts by weight of A), 40 to 75 parts by weight of B) and 0.01 to 5 parts by weight of C).

5. A polyorganosiloxane mixture according to claim 1, having a viscosity of less than 1 000 mPas at 20° C.

6. A polyorganosiloxane mixture according to claim 4, wherein the reaction is additionally carried out with 0.01 to 7 parts weight of water and/or with 10 to 30 parts by weight of polyorganosiloxane D).

7. A polyorganosiloxane mixture according to claim 1, wherein the reaction is carried out at a temperature of 10 to 130° C.

8. A polyorganosiloxane mixture according to claim 1, wherein the reaction is carried out in the range from 30 minutes to 24 hours.

9. A composition obtainable by dispersing a polyorganosiloxane mixture according to claim 1 in water, optionally in the presence of a dispersant, and optionally adjusting the pH of the dispersion to a value of 2 to 4.

10. A process for preparing a polyorganosiloxane mixture, which comprises reacting a linear polyorganosiloxane A) containing 5 to 70 silicon atoms, units of the general formula (I)

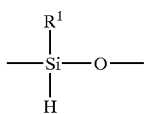
(I)

and optionally units of the general formula (II)

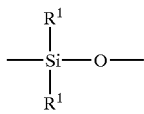
(II)

and having end groups formed by $(R^1)_3Si$—O— radicals or by $H(R^1)_2Si$—O— radicals, with a linear α,ω-dihydroxypolydiorganosiloxane B) containing 10 to 150 silicon atoms, units of the abovementioned general formula (II) and optionally in addition units of the formula (IV)

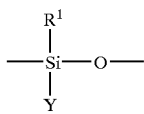
(IV)

and having end groups formed by HO Si$(R^1)_2$—O— radicals
and with a silane C) of the general formula (III)

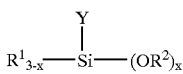
(III)

and optionally with a linear polyorganosiloxane D) containing either units of the formula (I) or of the modified formula (I) where the hydrogen atom is replaced by OH and additionally units of the formula (IX)

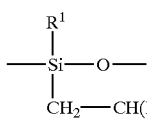
(IX)

and optionally units of the formula (II), the end groups of the polyorganosiloxane D) being formed by $(R^1)_3Si$—O— radicals or by $HO(R^1)_2Si$—O— radicals, wherein every $R^1$ is independently an alkyl radical of 1–6 carbon atoms or a phenyl radical, every $R^2$ is independently an alkyl radical of 1–6 carbon atoms, Y is a radical of the formula V, VI, VII or VIII

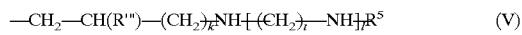
(V)

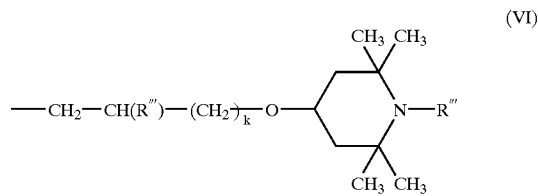
(VI)

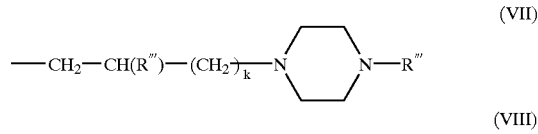
(VII)

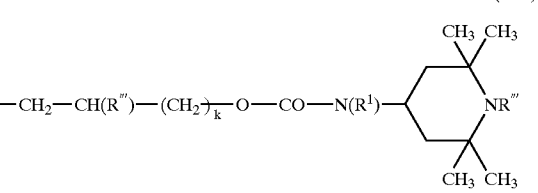
(VIII)

where
$R'''$ is H or $CH_3$,
one of R' and R" is hydrogen and the other is $CH_3$,
m is from 5 to 40,
k is from 0 to 6,
t is from 2 to 8,
n is from 0 to 10,
l is from 0 to 3,
$R^5$ is H, —CO—$CH_3$, —CO—$(CH_2)_k$OH, —$CH_2$—$(CH_2)_k$ $CH_3$ or cyclohexyl and x is from 1 to 3, the reaction being carried out without polyorganosiloxane containing units of the general formula $R^4SiO_{1.5}$ where $R^4$ is a monovalent organic radical, as starting material and the reaction being carried out in such a way that the number of the Si—H units present in the polysiloxane mixture obtained is 60 to 95% of the number of Si—H units which were present in the form of the components A) and D) prior to the reaction and the reaction being carried out without use of a metal-containing crosslinking or condensation catalyst.

11. A process according to claim 10, wherein water is additionally used in the reaction.

12. A process according to claim 10, wherein the addition of one of the components A) and C) to the reaction mixture only takes place after the addition of component B).

13. A process according to claim 10, wherein the reaction is carried out at a temperature of 10 to 130° C.

14. A process according to claim 10, wherein 20 to 60 parts by weight of a linear polyorganosiloxane A) are reacted with 40 to 75 parts by weight of an α,ω- dihydroxypolydiorganosiloxane B) and with 0.01 to 5 parts by weight of a silane C) and optionally with 0.01 to 7 parts by weight of water and optionally with 10 to 30 parts by weight of a polyorganosiloxane D).

15. A process for preparing a composition that includes a polysiloxane mixture, which comprises first conducting a process according to claim 10 and subsequently dispersing the resulting polyorganosiloxane mixture in water, optionally in the presence of a dispersant or dispersant mixture, and optionally adjusting the pH of the dispersion to a value of 2 to 4.

16. The method of treating fiber materials, which comprises applying a polyorganosiloxane mixture according to claim 1 thereto.

17. The method of treating fiber materials, which comprises applying a polyorganosiloxane composition according to claim 9 thereto.

18. A process according to claim 11 wherein the reaction is carried out until not less than 95% of the water has reacted.

* * * * *

UNITED STATES PATENT AND TRADEMARK OFFICE
CERTIFICATE OF CORRECTION

PATENT NO. : 6,706,812 B2
DATED : March 16, 2004
INVENTOR(S) : Harald Chrobaczek et al.

It is certified that error appears in the above-identified patent and that said Letters Patent is hereby corrected as shown below:

<u>Title page,</u>
Please Insert Item:

-- [30]    Foreign Application Priority Data

19 April 2000    [EPO]    00108509 --.

Signed and Sealed this

Twenty-third Day of November, 2004

JON W. DUDAS
*Director of the United States Patent and Trademark Office*